Sept. 19, 1944.  J. TURNER  2,358,608
COMBINATION TOOL
Filed March 29, 1943    2 Sheets-Sheet 1
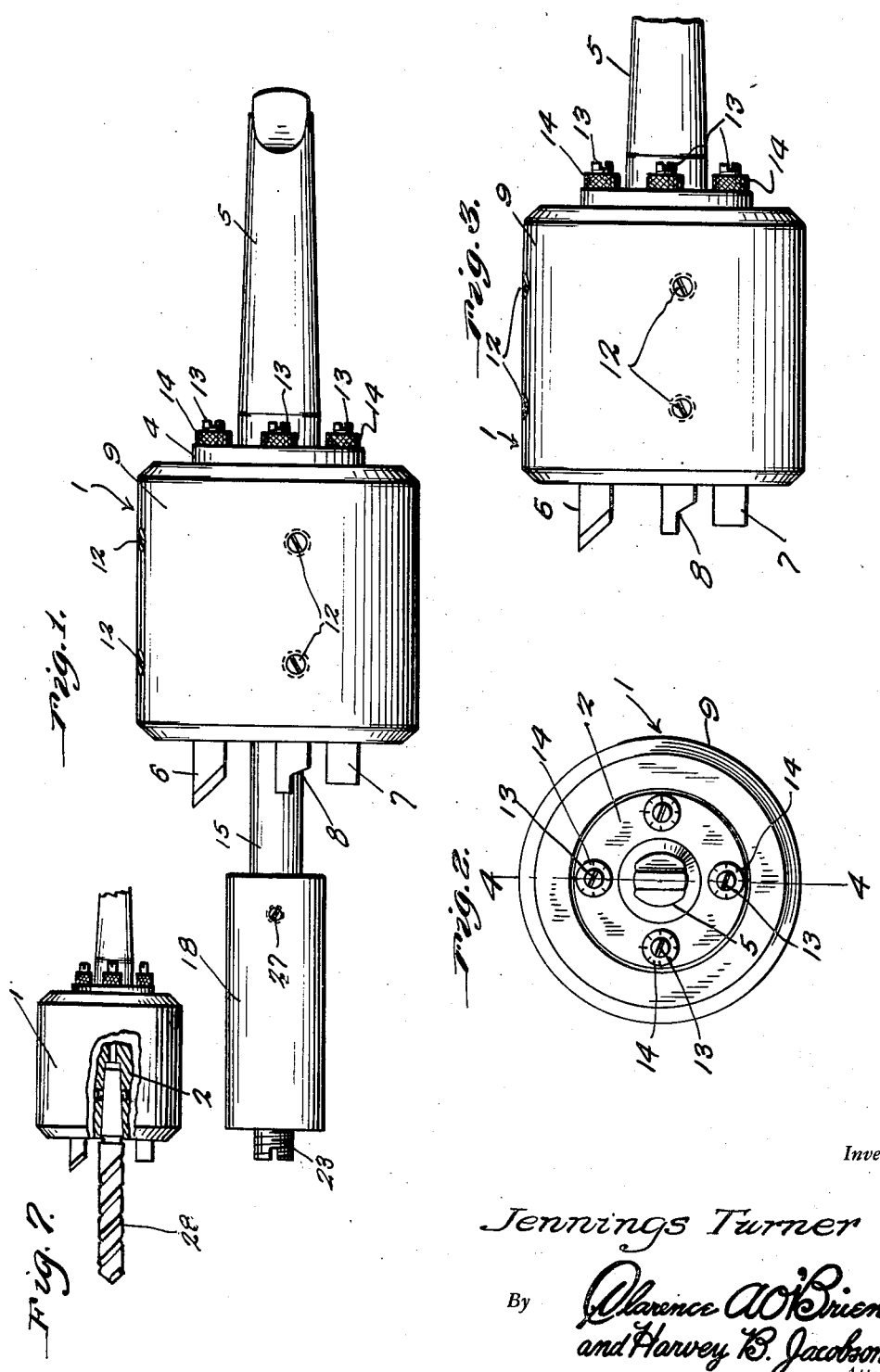
Inventor
*Jennings Turner*
By *Clarence A. O'Brien and Harvey B. Jacobson*
Attorneys Sept. 19, 1944.  J. TURNER  2,358,608
COMBINATION TOOL
Filed March 29, 1943  2 Sheets-Sheet 2
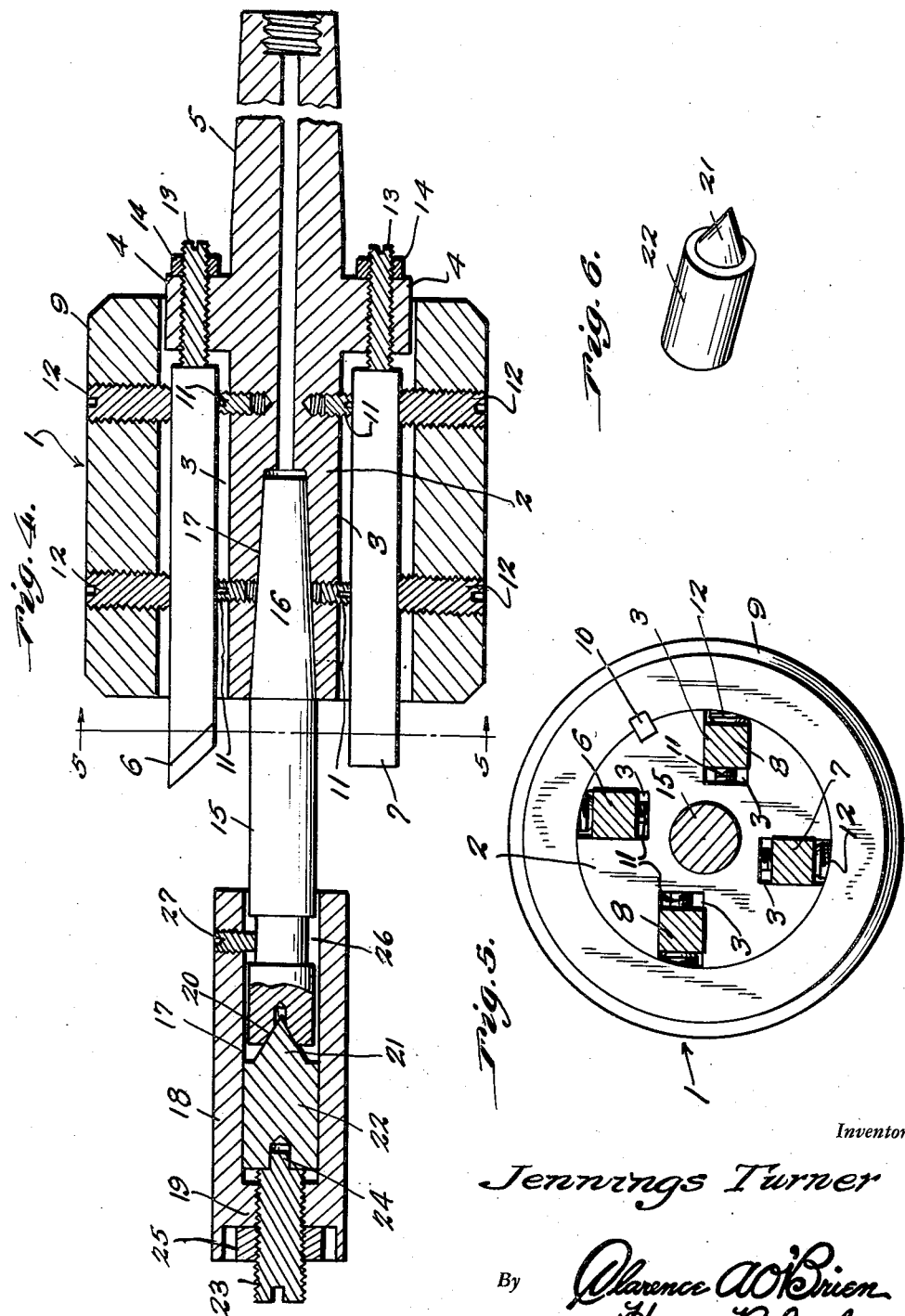
Inventor
Jennings Turner
By Clarence A. O'Brien
and Harvey B. Jacobson
Attorneys Patented Sept. 19, 1944

2,358,608

UNITED STATES PATENT OFFICE 2,358,608

COMBINATION TOOL

Jennings Turner, Murray, Ky.

Application March 29, 1943, Serial No. 481,025

4 Claims. (Cl. 77—58)

My invention relates to improvements in combination tools of the fly cutter type, the primary object in view being to provide an efficient tool for use in lathes, drill presses, or milling machines, to accurately chamfer and bore, or counterbore, stocks, and which combines in its equipment a pilot working on a fixed center to insure accuracy in operation, and is easy to install, simple in construction, adapted for prolonged use, and comparatively inexpensive to manufacture.

Other and subordinate objects are also comprehended by my invention, all of which, together with the precise nature of my improvements, will be readily understood when the succeeding description and claims are read with reference to the drawings accompanying and forming part of this specification.

In said drawings:

Figure 1 is a view in side elevation of my improved combination tool in its preferred embodiment, Figure 2 is a view in rear end elevation, Figure 3 is a view in side elevation of the tool holder or magazine, Figure 4 is a view in longitudinal section taken on the line 4—4 of Figure 2 and drawn to an enlarged scale, Figure 5 is a view in transverse section taken on the line 5—5 of Figure 4, Figure 6 is a view in perspective of the center, and Figure 7 is a side elevational view, with parts broken away and shown in section, and showing the manner of interchangeably mounting a bit in the head.

Reference being had to the drawings by numerals, my improved combination tool comprises a tool holder, or magazine, 1 including as its basic element a substantially cylindrical elongated head 2 provided with transversely square, longitudinal grooves 3 in the periphery thereof open at the front end of said head 2 and closed at the rear end thereof by a solid rear end of said head and designated by the numeral 4. An axial shank 5 extends from said rear end 4 of the head 2 and which is preferably, but not necessarily, tapered for insertion and clamping in the head stock, not shown, of a lathe. There are preferably four slots 3 in said head 2 arranged in 90 degree angular relation and which are designed to each accommodate a bar-like cutting tool transversely square and fitting in the groove, with its cutting end extending out of the groove. The tools are designed to work on tubular or solid stock mounted in the usual manner in the tail stock, not shown, of the lathe and, as shown, may be of various types. For instance, one designated 6 may be a beveled edge chamfering bit, another designated 7 a bit for cutting down the end of the stock, and the others, one of which is designated 8, a cut-back counter-bore bit. Surrounding the head 2 is a fitted tool clamping sleeve 9 keyed, as at 10, to said head and detachable endwise from the head. A pair of tool adjusting screws, or pins, 11 are threaded into the bottom of each slot 3 adjacent opposite ends of the slot, respectively, said screws supporting the tool on one side of the latter. On the other side thereof, each tool is supported by a pair of "Allen" set screws 12 threaded into the sleeve 9 radially to bear against said other side of the tool adjacent the screws 11. By detaching the sleeve 9 and setting the screws 11, the tools 6, 7, 8 may be adjusted laterally as occasion may require and clamped against the screws 11 by replacing the sleeve 9 and tightening the set screws 12. For each tool 6, 7, 8 a micrometer screw 13 is threaded through the rear end 4 of the head 2 against the butt end of the tool and provided with the usual graduated lock nut 14. The screws 13 provide for adjusting the tools 6, 7, 8 inwardly or outwardly of the slots 3 in the event that such adjustment of the tools is required.

Extending forwardly from the head 2, axially thereof, is a pilot mandrel 15 provided with a preferably tapered tail end 16 fitted in a correspondingly shaped socket 17 in said head 2. The other end of the pilot mandrel 15 is extended for a suitable distance into one end of a bore 17 of a sleeve 18, said bore 17 being closed at its other end, as at 19. An axial tapered bearing socket 20 is provided in said other end of the pilot mandrel 15 and which is designed to rotate on a tapered bearing end 21 of an otherwise cylindrical center 22 slidably fitted in the bore 17 between said pilot mandrel and the closed end 19 of said bore. A micrometer set screw 23 threaded through the closed end 19 of the bore 17 axially of the center 22 is operatively connected, as at 24, to the other end of said center to adjust the same along the bore 17 and is provided with the usual lock nut 25 for turning against said end 19. An annular groove 26 is provided in the pilot mandrel 15 adjacent the bearing socket 20 and a screw 27 is threaded radially through said sleeve 18 into the groove 26, said screw 27 being of reduced diameter as compared with the width of the groove 26.

The sleeve 18 is designed to fit in the bore of the stock and to remain stationary, together with the center 22, and the pilot mandrel 15 to revolve on said center as the tool holder, or magazine, 1 is revolved against the work.

Any suitable means, not shown, may be utilized as an abutment for the set screw 23 to limit sliding of the sleeve 18 in the base of the stock inwardly of the stock, for instance, a closed rear end of a bore. By presetting the set screw 23 to adjust the sleeve 18 and center 22 relatively, longitudinally, the distance to which the stock, or work, may be fed toward the tools under adjustment of the tail stock, before the set screw 27 abuts the side of the slot 26, approached by the screw under such feeding, may be varied as desired to correspondingly predetermine the depth to which the tools will work in the end of the stock or work. As will be clear, the set screw 27 provides for retaining the sleeve 18 on the pilot mandrel 15.

As previously mentioned, my improved combination tool may be used in a drill press or milling machine. However, it is not deemed necessary to a proper understanding of my invention to describe the use and operation thereof in such machines.

As will be readily apparent, my improved tool holder may be used alone without the pilot mandrel 15, center 22 and sleeve 18 on various kinds of work and in any selected use thereof is designed to cut down, chamfer and undercut in one operation.

A drill bit, reamer or similar tool 28 may be interchangeably mounted in the head 2 in place of the mandrel 15 as indicated in Figure 7.

Adjusting screws 11 and 12 being in radial alignment enables the setting of each tool independently without removing sleeve 9, and merely by removing the screws 12 and the tools 6, 7 and 8, thereby affording access to the screws 11 by a screw driver.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claims.

What I claim is:

1. In a device of the class described, a tool holder for mounting in the head stock of a lathe or the like for rotation relative to tubular work fed toward the same, a plurality of bits mounted in said holder for simultaneous operation against the work under rotation of the holder and constructed and arranged to perform different cutting operations on the work, and piloting means connected to said holder comprising a cylindrical center having a tapered bearing end, means to fix said center in the work, and a pilot mandrel rotatable by said holder against said bearing end of the center.

2. In a device of the class described, a tool holder for mounting in the head stock of a lathe or the like for rotation relative to tubular work fed toward the same, a plurality of bits mounted in said holder for simultaneous operation against the work under rotation of the holder and constructed and arranged to perform different cutting operations on the work, and piloting means connected to said holder comprising a cylindrical center having a tapered bearing end, means to fix said center in the work, and a pilot mandrel rotatable by said holder against said bearing end of the center, said means comprising a sleeve adapted for insertion in the work and to remain stationary therewith, said center being fitted in said sleeve.

3. In a device of the class described, a tool holder for mounting in the head stock of a lathe or the like for rotation relative to tubular work fed toward the same, a plurality of bits mounted in said holder for simultaneous operation against the work under rotation of the holder and constructed and arranged to perform different cutting operations on the work, and piloting means connected to said holder comprising a center, means to fix said center in the work, and a pilot mandrel rotatable by said holder against said center, said means comprising a sleeve adapted for insertion in the work and to remain stationary therewith, said center being fitted in said sleeve, said sleeve and center being relatively adjustable slidably to predetermine the depth to which said tools will cut into the work, and means to adjust said sleeve and center relatively in predetermined degree.

4. In a device of the class described, a tool holder for mounting in the head stock of a lathe or the like for rotation relative to tubular work fed toward the same, and a plurality of bits mounted in said holder for simultaneous operation against the work under rotation of the holder and constructed and arranged to perform different cutting operations on the work, said holder comprising a longitudinally slotted cylindrical head having said tools loosely fitted in the slots thereof, and means to clamp said tools in said slots comprising a clamping sleeve fitted over said head, screws extending from the bottoms of the slots against said tools on one side thereof, and screws extending from said clamping sleeve into said slots against the opposite sides of the tools, said screws being settable to adjust the tools toward and from the axis of rotation of the holder.

JENNINGS TURNER.